Dec. 24, 1940.   F. W. McCONNEL ET AL   2,226,206
HOP-PICKING MACHINE
Filed Oct. 18, 1939    4 Sheets-Sheet 1
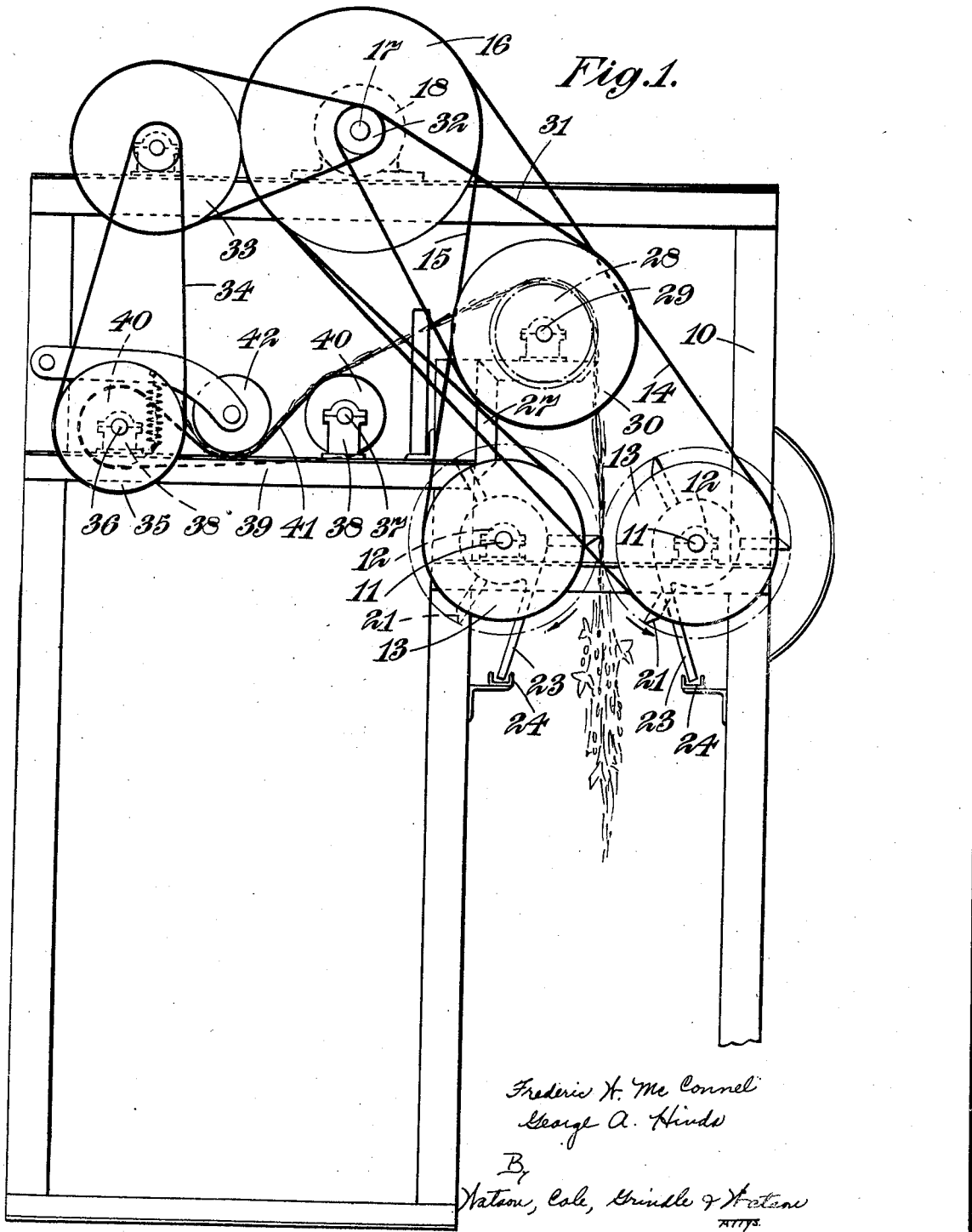

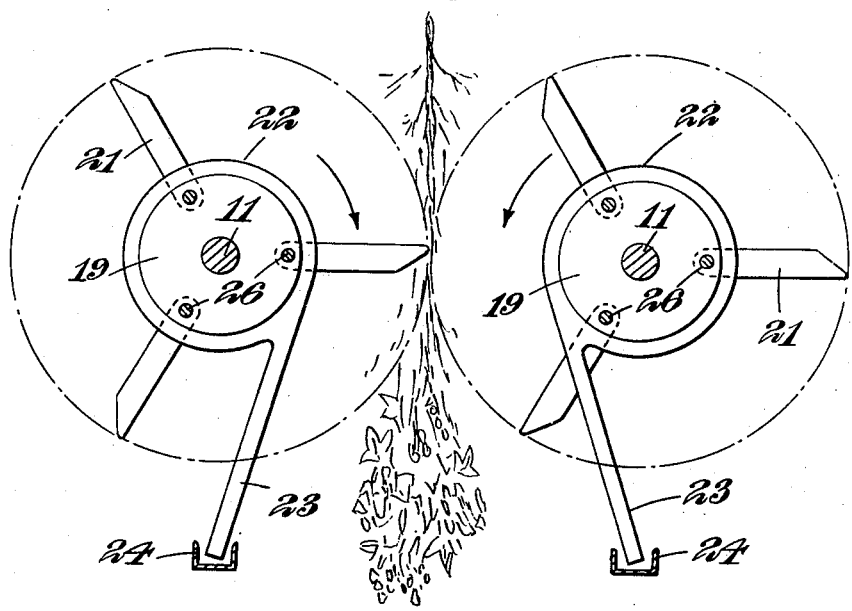
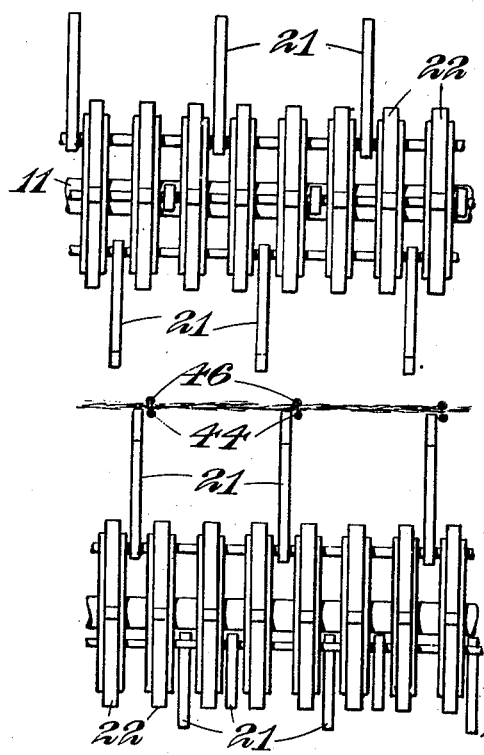

Dec. 24, 1940.   F. W. McCONNEL ET AL   2,226,206
HOP-PICKING MACHINE
Filed Oct. 18, 1939   4 Sheets-Sheet 3

Dec. 24, 1940.    F. W. McCONNEL ET AL    2,226,206
HOP-PICKING MACHINE
Filed Oct. 18, 1939    4 Sheets—Sheet 4

Patented Dec. 24, 1940

2,226,206

UNITED STATES PATENT OFFICE 2,226,206

HOP-PICKING MACHINE

Frederic Whigham McConnel, Clifton-on-Teme, and George Arthur Hinds, Malvern, England, assignors to McConnel Hinds Limited, Martley, Worcestershire, England, a British company Application October 18, 1939, Serial No. 300,082
In Great Britain October 7, 1938

16 Claims. (Cl. 130—30)

This invention is for improvements in or relating to hop-picking machines and has for an object to provide a machine which is suitable for picking hop flowers either from a complete bine or from one which has been partly denuded of hops or from branches which have been detached from the main bine.

According to this invention, a hop-picking machine comprises a rotor having a number of fingers pivotally connected thereto around its circumference, means for rotating said rotor at such speed that the fingers move outwardly under centrifugal force and means for traversing and guiding the hop bines or branches in the path of said fingers. Preferably, two rotors are arranged with their driving shafts parallel to one another and are rotated in opposite directions, in which case the bines or branches are traversed between the two rotors. Said traversing means may be arranged to move the bines or branches in the opposite direction to the movement of the fingers. The traversing means may be arranged to move the bines across the width of the rotor as well as in a direction transverse to the axis of rotation of the rotor. This arrangement enables a bine to be inserted in the machine before the hop flowers have been completely stripped from a previously-inserted bine.

The aforesaid fingers may be distributed across the width of the rotor in such manner that adjacent fingers are circumferentially displaced from one another.

A number of fixed guard bars are preferably spaced apart in the manner of a comb so that the aforesaid fingers pass between the spaces formed between the bars. This arrangement prevents the separated branches from becoming wound around the rotors.

In one constructional form of the invention, each rotor comprises a number of discs spaced apart along a driving shaft and a finger adapted to project beyond the periphery of the discs is pivotally mounted between each pair of discs. The disc may be encircled by a strap to which is fixed a guard bar, the ends of which guard bar are located in a fixed channel.

The aforesaid means for traversing the hop bines or branches past the fingers may comprise an endless driven belt or the like and a second driven belt or driven pulley arranged opposite a stretch of the first said belt in such a manner that the bine may be gripped between them. In an arrangement in which the rotors are arranged side-by-side with their axes in a plane transverse to the vertical, the traversing means are arranged to move the bine upwardly between the two rotors. On the other hand, in an arrangement wherein the rotors are arranged one above the other, the traversing means are arranged to draw the bine between the rotors in a direction transverse to the vertical.

The following is a description of one form of machine constructed according to this invention, reference being made to the accompanying drawings, in which—

Figure 1 is a diagrammatic side elevation of the machine,

Figure 2 is an end elevation of the two rotors upon an enlarged scale,

Figure 5 is a vertical section through the machine on the line 5—5 of Figure 4.

Like reference numerals refer to like parts in the various figures of the drawings.

Figure 3:
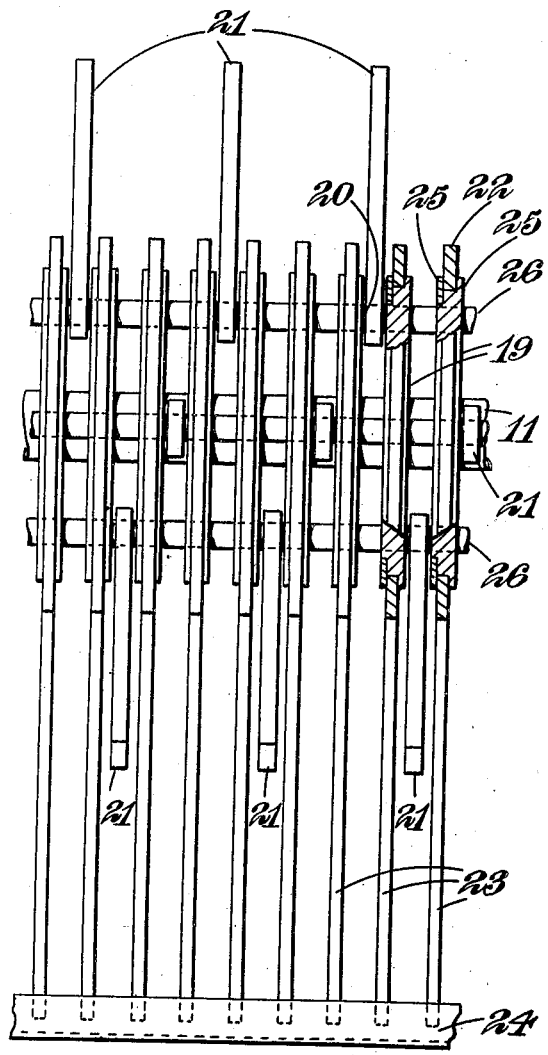
Figure 3 is a view of one of the rotors looking in a direction transverse to the driving shaft.

Referring to the construction shown in Figures 1 to 3, there are mounted side-by-side on a framework 10 two horizontally disposed shafts 11 which are carried by suitable bearings 12. Each shaft has secured to it a pulley 13. The pulleys are engaged by driving belts 14 and 15 which encircle a pulley 16 fixed to the driving shaft 17 of an electric motor 18 carried on the framework. The belt 15 is crossed so that the two pulleys 13 are driven in opposite directions. Fixed to each shaft 11 is a rotor which is constructed in the manner shown in Figures 2 and 3. Each rotor comprises a number of discs 19 fixed to and spaced apart along one of the shafts 11. Between each pair of adjacent discs is pivoted at 20 a single finger 21 the pivot points of adjacent fingers being circumferentially displaced by 120°. Each disc is encircled by a strap 22 having a downwardly extending guard bar 23 the lower extremity of which is engaged by a channel 24 secured to the frame 10. The straps may be located in position on the discs 19 by providing the discs with flanges 25 which engage the sides of the straps. The pivotal mounting for the fingers may comprise three rods 26 which extend through all the discs and are displaced apart by 120°. The rods may also serve to clamp the discs together and may be provided with spacing collars not shown. The tips of the flanges are inclined rearwardly in relation to the direction of rotation of the rotors. Referring again to Figure 1, there is mounted on a bracket 27 above the rotors a worm guide 28. The guide is provided with a helical worm thread. The shaft 29 of the worm guide has secured to it a pulley 30 which is driven by a belt 31 from a small pulley 32 on the motor shaft 17. This small pulley 32 also serves to drive the larger element of a compound pulley 33 mounted on the frame 10. The smaller element of the compound pulley is encircled by a belt 34 which drives a larger pulley 35 secured to a shaft 36. This shaft and another shaft 37 arranged parallel to it are carried in bearings 38 supported by a cross member 39 of the frame. The shafts carry wide pulleys 40 which are encircled by a wide belt 41 the upper stretch of which belt is engaged by a jockey pulley 42.

In operation the root ends of the bines are continuously fed by hand upwardly between the two rotors, then are carried over the worm guide and between the jockey pulley and the wide belt; thus, as the rotors rotate, the bine is drawn upwardly and at the same time traversed along the length of the rotors by the worm guide. The fingers on the rotors are thrown radially outwards by centrifugal force and their tips engage the hop flowers and tear them from the bine. The fingers are of such a length and the rotors are so spaced apart that a gap of about ⅜ of an inch separates the paths of movement of the fingers. The traversing of the bine along the length of the rotors enables fresh bines to be inserted in the machine before all the hops have been stripped from a previous bine.

The hops and leaves fall by gravity through an opening at the bottom of the frame below the point of tangency of the cooperating rotors either on to a dump from which they are collected or on to a chute or conveyor (not shown) by which they may be delivered to a machine in which the hop flowers are separated from the leaves.

Figure 4:
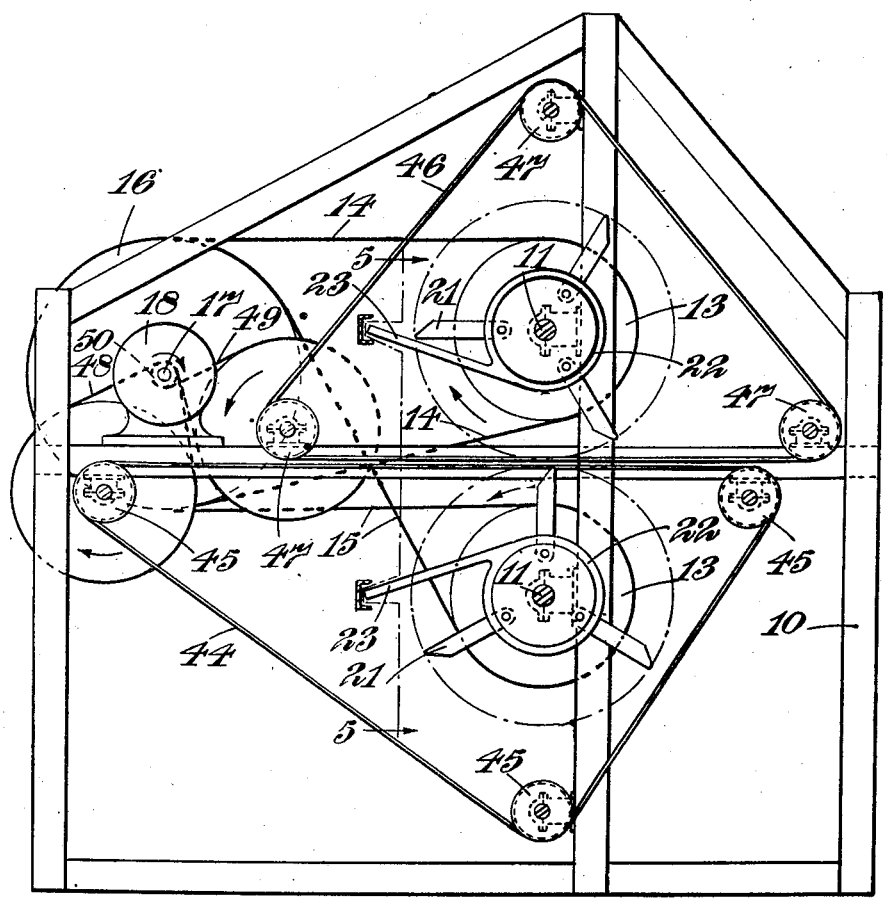
Figure 4 is a diagrammatic side elevation of an alternative construction of machine.

In the construction shown in Figures 4 and 5, the rotors, instead of being mounted side-by-side, are arranged one above the other and the bines are fed in a horizontal direction between them. This is effected by laying the bines across a lower set of endless cords 44 which are supported by three grooved pulleys 45, as best seen in Figure 4. A further upper set of endless cords 46 are supported on pulleys 47 so that a horizontal stretch of the cords bears on the bines which rest on part of the lower set of cords.

The pulleys 45 and 47 are driven in the same direction by belts 48 and 49 which encircle the pulley 50 on the shaft 51 of the driving motor 18. The driving motor drives the rotors 13 through belts 15 and 15 from a pulley 16. The rotors are provided with fingers and guard members in a similar manner to that described with reference to the construction shown in Figures 1 to 3.

We claim:

1. A hop-picking machine comprising two rotors arranged with their axes parallel to one another, a number of fingers freely pivotally connected to each rotor around its circumference, means for rotating said rotors at such speed that said fingers are flung outwardly under centrifugal force to exert a beating action on the bines, and means for traversing and guiding the hop bines between the two rotors and into the path of the travel of the tips of the fingers.

2. A hop-picking machine comprising a rotor, a number of fingers freely pivotally connected to said rotor around its circumference, means for rotating said rotor at such speed that said fingers are flung outwardly under centrifugal force to exert a beating action on the bines, and means for traversing and guiding the hop bines in the path of travel of the tips of the fingers and in a direction opposite to the travel of said fingers.

3. A hop-picking machine comprising two rotors arranged with their axes parallel to one another, a number of fingers freely pivotally connected to each rotor, means for rotating said rotors in opposite directions at such speed as to cause said fingers to be flung outwardly by centrifugal force, and means for traversing and guiding the hop bines between the rotors in the path of travel of the tips of the fingers and in a direction opposite to the direction of movement of the fingers.

4. A hop-picking machine comprising a rotor, a number of fingers pivotally connected to said rotor around its circumference, means for rotating said rotor at such speed that said fingers move outwardly under centrifugal force, means for imparting to the hop bines a movement across the width of the rotor and a movement in a direction transverse to the axis of rotation of the rotor in the path of travel of the tips of the fingers.

5. A hop-picking machine comprising a rotor, a number of separate fingers freely pivotally connected thereto and spaced apart across the width of the rotor in such a manner that adjacent fingers are circumferentially displaced from one another, means for rotating said rotor at such speed that said fingers are flung outwardly under centrifugal force, and means for traversing and guiding the hop bines in the path of travel of the tips of the fingers.

6. A hop-picking machine comprising a rotor, a number of fingers pivotally connected to said rotor around its circumference, means for rotating said rotor at such speeds that said fingers move outwardly under centrifugal force, means for traversing and guiding the hop bines in the path of travel of the tips of the fingers, and a plurality of fixed guard bars arranged in the manner of a comb to one side of the path of travel of the bines so that said fingers pass between the spaces formed between said bars.

7. A hop-picking machine comprising a number of discs spaced apart along a driving shaft, a single finger pivotally mounted between each pair of discs and adapted to project beyond the periphery of said discs, means for rotating said discs at such speed that said fingers move outwardly under centrifugal force and means for traversing and guiding the hop bines in the path of travel of the tips of the fingers.

8. A hop-picking machine comprising a rotor, a number of fingers pivotally connected to said rotor around its circumference and spaced apart across its width, means for rotating said rotor at such speed that said fingers move outwardly under centrifugal force, a continuous driven belt arranged to one side of said rotor, means adapted to press the bine against said belt which is driven in such a direction as to draw the hop bine past the fingers of said rotor.

9. A hop-picking machine comprising a rotor, a number of fingers pivotally connected to said rotor around its circumference, means for rotating said rotor at such speed that said fingers move outwardly under centrifugal force, a continuous driven belt arranged to one side of said rotor and movable transversely in relation to the axis of said rotor, a driven pulley associated with one stretch of said belt and adapted to grip a hop bine between it and said belt, which pulley and belt are driven in such a direction to draw the bine past the fingers of said rotor.

10. A hop-picking machine comprising two rotors arranged with their axes parallel and in a plane transverse to the vertical, a number of fingers pivotally connected to each rotor around its circumference, means for rotating the two rotors in such a direction that the adjacent peripheries of the rotors move in a downward direction, a worm shaft mounted above the two rotors and having its axis parallel to the axes of the rotors, a continuous driven belt arranged to one side of said worm shaft and extending in a direction transversely thereto, which belt has a width approximately the same as the length of the worm shaft, a roller of the same width as the belt and arranged to grip a bine between it and the belt.

11. A hop-picking machine comprising two rotors arranged one above the other, a number of fingers pivotally connected to each said rotor, means for driving said rotors, so that their adjacent peripheries move in the same direction, a plurality of pairs of endless driven belts, each pair having two of their stretches closely adjacent to one another and extending between the rotors and adapted to grip a bine, and means for driving the belts so that they move the bine in an opposite direction to the movement of said adjacent peripheries.

12. A hop-picking machine comprising two rotors arranged one above the other, a number of fingers pivotally connected to each said rotor, means for driving said rotors so that their adjacent peripheries move in the same direction, a plurality of pairs of endless cords, the cords in each pair being spaced apart and arranged so that certain cords of one pair are disposed above cords in the other pair and are adapted to grip between them bines arranged across the cords, and means for driving the cords so that they move the bines in an opposite direction to the movement of the adjacent peripheries.

13. A hop-picking machine comprising a rotor, a number of fingers freely pivotally connected to said rotor around its circumference, means for rotating said rotor at such speed that said fingers are flung outwardly under centrifugal force, the leading edges of the tips of which fingers are inclined rearwardly in relation to the direction of rotation, and means for traversing and guiding the hop bines into the path of travel of the tips of the fingers.

14. A hop-picking machine comprising a frame, a pair of rotors mounted in said frame with their axes parallel with one another, each of which rotors comprise a shaft having fixed thereto a number of discs and a finger pivotally mounted between each pair of discs and adapted to project beyond the periphery thereof, a strap encircling each disc in bearing relationship, a guard bar fixed to each strap, a channel member fixed to the frame for accommodating the ends of the guard bars, means for rotating said rotors in opposite directions at such speed that the fingers move outwardly beyond the discs under centrifugal force, and means for feeding the bines between the rotors in a direction opposite to the direction of movement of said fingers.

15. A hop-picking machine comprising a rotor, a number of single-ended fingers freely pivoted to said rotor around its circumference, means for traversing and guiding the hop bines past said rotor, means for rotating said rotor at such speed as to cause said fingers to move outwardly under centrifugal force into the bine, which fingers, being freely pivoted, are adapted automatically to be withdrawn from the bine upon encountering obstructions.

16. A hop-picking machine comprising a number of discs spaced apart along a driving shaft, a finger pivotally mounted between each pair of discs and adapted to project beyond the periphery of said discs, a strap encircling each disc in bearing relationship therewith, a guard bar attached to each strap and a fixed channel for accommodating the ends of the guard bars, means for rotating said shaft at such speed that said fingers move outwardly under centrifugal force and pass between said guard bars, and means for traversing and guiding the hop bines transversely to the shaft and in the path of travel of the extended tips of said fingers.

FREDERIC WHIGHAM McCONNEL.
GEORGE ARTHUR HINDS.